United States Patent [19]
Seckerson

[11] 3,782,437
[45] Jan. 1, 1974

[54] THREADED BOLT AND MOUNTING THEREFOR

[75] Inventor: Clifford Alexander Seckerson, Iver Heath, Buckinghamshire, England

[73] Assignee: TRW Inc., Cleveland, Ohio

[22] Filed: Sept. 29, 1971

[21] Appl. No.: 184,754

[30] Foreign Application Priority Data
Oct. 5, 1970    Great Britain................... 47,319/70

[52] U.S. Cl.................... 151/49, 151/41.75, 151/69
[51] Int. Cl............................................ F16b 39/26
[58] Field of Search.................... 151/50, 52, 69, 49, 151/41.75; 85/81, 9, 80

[56] References Cited
UNITED STATES PATENTS

| | | | |
|---|---|---|---|
| 292,507 | 1/1884 | Plummer................................ | 151/50 |
| 1,427,953 | 9/1922 | Harrison................................ | 151/69 |
| 2,244,570 | 6/1941 | Pignam................................. | 151/50 |
| 2,560,961 | 7/1951 | Knohl.................................... | 151/69 |
| 2,899,733 | 8/1959 | Sundberg.............................. | 151/50 |
| 3,492,910 | 3/1970 | Van Niel et al. ..................... | 85/81 |
| 3,561,516 | 2/1971 | Reddy................................... | 151/69 |

FOREIGN PATENTS OR APPLICATIONS

| | | | |
|---|---|---|---|
| 397,710 | 5/1909 | France................................. | 151/52 |
| 143,524 | 10/1921 | Great Britain........................ | 151/52 |
| 750,894 | 6/1956 | Great Britain........................ | 85/9 R |

*Primary Examiner*—Edward C. Allen
*Attorney*—Philip E. Parker et al.

[57] ABSTRACT

A two-part threaded fastener comprising a bolt and a retainer captive on the bolt suitable for use as a vehicle headlamp reflector bowl adjustment screw. The bolt has a threaded shank which is formed with resilient projecting means adjacent to but spaced from an externally non-circular head. The retainer comprises a base having an aperture through which the resilient projecting means on the shank of the bolt is a force fit so that the base is captive between the head and the resilient means. The retainer is also formed with at least one upstanding wall and the head of the bolt with at least one face adapted to inter-engage with the wall on the retainer to resist relative rotation between the bolt and the retainer, the wall of the retainer being sufficiently resilient to allow rotation of the head of the bolt relative to the retainer when the bolt is subjected to a predetermined torque sufficient to deflect the wall.

5 Claims, 8 Drawing Figures

PATENTED JAN 1 1974 3,782,437
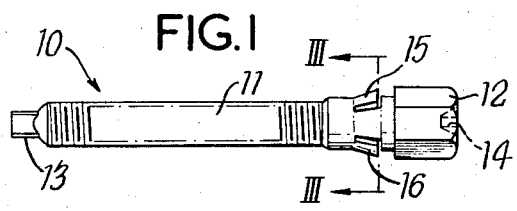
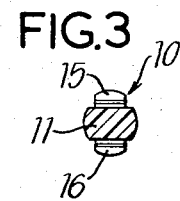
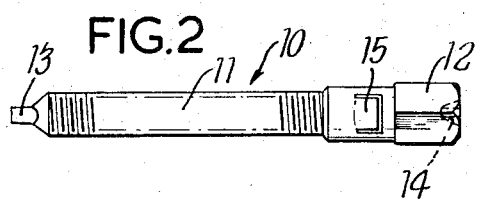
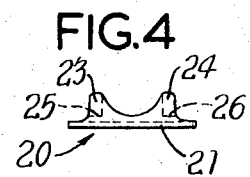
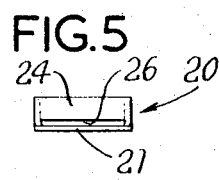
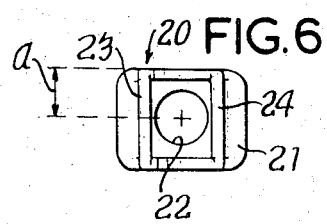

3,782,437

THREADED BOLT AND MOUNTING THEREFOR

BACKGROUND TO THE INVENTION

The present invention relates to a threaded fastener comprising a bolt and a retainer captive on the bolt and also to an assembly including the fastener. The fastener of the present invention is particularly suitable for use as a vehicle headlamp reflector bowl adjustment screw.

I have found that there is a need, in particular in the vehicle industry for a threaded bolt which can be readily attached to a support panel in such a manner that it is normally held against rotation relative to the support panel but which when subjected to a predetermined torque will rotate through a predetermined angle. This type of adjustable nut is particularly useful in securing a vehicle headlamp reflector bowl in position so that rotation of the nut causes axial displacement of the nut and tilting of the reflector bowl.

It is already known to provide a bolt which has a head and a cylindrical neck portion beneath the head which is captive in a circular aperture in a support panel. However, this known bolt has the disadvantage that it is freely rotatable relative to the support panel and can be used only in combination with a complex and expensive nut.

In contrast with the prior art, the present invention provides a threaded fastener comprising a bolt and retainer captive on the bolt which is cheap to mass-produce, easy to assemble and use and which furthermore ensures that the bolt can only be rotated relative to the support panel when subjected to a predetermined torque.

STATEMENT OF THE INVENTION

A two-part threaded fastener comprising a bolt which has a threaded shank and an externally non-circular head and a retainer which is captive on the bolt and which is adapted to resist relative rotation between the bolt and the retainer, the shank being formed with resilient projecting means adjacent to but spaced from the head and the retainer comprising a base having an aperture through which the resilient projecting means is a force fit and being captive between the head and the said resilient means, wherein the retainer is formed with at least one upstanding wall and the head of the bolt is formed with at least one face, the said wall and the said face being adapted to inter-engage to resist rotation of the bolt relative to the retainer and the said wall being sufficiently resilient to allow rotation of the head of the bolt when the bolt is subjected to a predetermined torque sufficient to deflect the said wall.

DESCRIPTION OF THE DRAWINGS

FIGS. 1 and 2 are respectively a front elevation and side elevation of a threaded bolt, FIG. 3 is a section taken on the line III—III of FIG. 1, FIGS. 4, 5 and 6 are respectively a side elevation, end elevation and plan view of a retainer for use with the bolt of FIGS. 1 to 3.

DESCRIPTION OF THE PREFERRED EMBODIMENT

Figure 7:
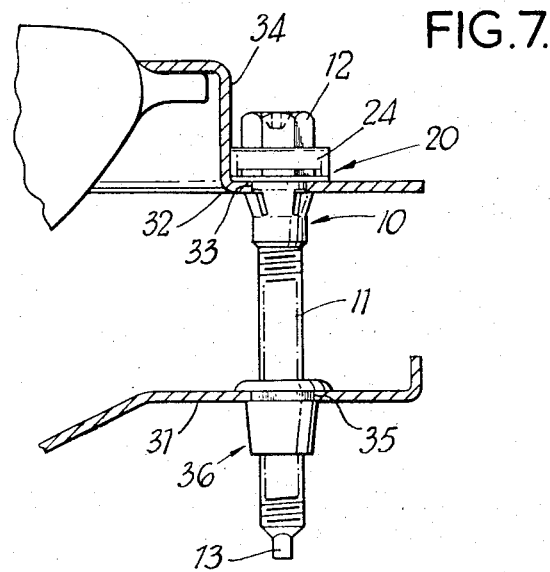
FIG. 7 is an elevation showing the bolt of FIGS. 1 to 3 mounted in an apertured panel with the aid of the retainer of FIGS. 4 to 6 and, FIG. 8 is a plan view of a part of the assembly shown in FIG. 8.

In FIGS. 1 to 3, a threaded bolt is indicated generally at 10, which forms one part of a two part fastener of the present invention. The bolt 10 is formed from a suitable synthetic plastics material such as an acetal resin by any convenient method such as by injection moulding.

The bolt 10 has a threaded shank 11, with a head 12 at one end and a tip 13 at the other end which is substantially flat and non-circular in section. The head 12 is in the shape of a hexagonal-sided nut and is also provided with an axially extending cruciform slot 14 in its outer face for the reception of a screwdriver. Torque can thus be applied to the head 12 by either a conventional spanner or by a screwdriver. The bolt 10 can also be rotated by using pliers or a similar tool to grip the tip 13 of the shank 11.

Immediately beneath the head 12 are a pair of resilient lugs 15 and 16 which are inclined outwardly from the axis of the shank 11 and which are directed towards the undersurface of the head 12.

FIGS. 4 to 6 illustrate a bolt retainer, which forms the other part of the two-part fastener of the invention and which is indicated generally at 20. The retainer 20 comprises a flat base 21 having a circular aperture 22 and, extending upwardly from the base 21 in parallel and on opposite sides of the aperture 22, a pair of walls 23 and 24, which serve to locate and restrain the head 12 of the bolt 10 when the bolt is assembled with the retainer. The walls 23 and 24 are formed with slots 25 and 26 respectively, adjacent the base 21, which slots increase the resilience and flexibility of the walls 23 and 24.

The retainer 20 is preferably injection moulded from a synthetic plastics material, such as an acetal resin.

Figure 8:
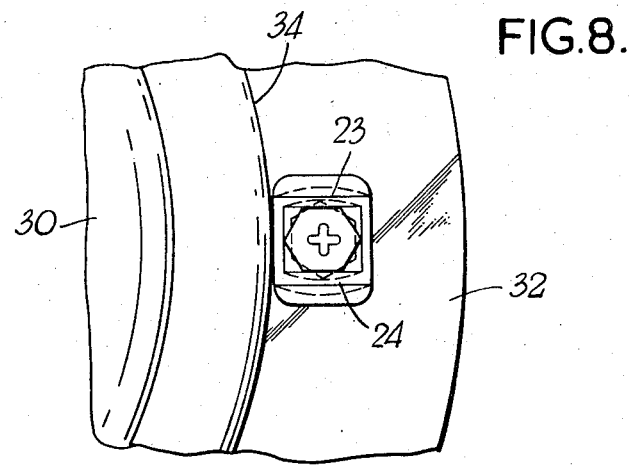

The bolt 10 and the retainer 20 are used to attach a vehicle headlamp reflector bowl 30 to a support panel 31, in the manner shown in FIGS. 7 and 8, so that the reflector bowl is positionally adjustable relative to the panel.

The reflector bowl 30 has an integral annular surrounding flange 32 which is formed with a circular aperture 33 to receive the bolt 10 and with an upstanding wall portion 34 adjacent the aperture 33. The wall portion 34 is spaced from the centre of the aperture 33 by a distance which is equal to the distance 'a' shown in FIG. 6 from the centre of the aperture 22 in the retainer 20 to a side of the retainer.

The support panel 31 is formed with an aperture 35 in which a threaded nut 36 is mounted so as to be non-rotatable relative to the panel.

The retainer 20 is first mounted on the bolt 10 by passing the shank 11 of the bolt through the circular aperture 22 in the retainer until the head 12 of the bolt is seated between the upstanding walls 23 and 24 of the retainer. The diameter of the aperture 22 is such that the shank 11 will pass through the aperture but the lugs 15 and 16 are compressed and then sprung outwardly behind the retainer so that the retainer is thereafter captive on the bolt.

The free ends of the lugs 15 and 16 are spaced from the head 12 of the bolt by an amount greater than the depth of the base 21 of the retainer. As can be seen best from FIG. 8 the head 12 of the bolt fits snugly between the walls 23 and 24 of the retainer and is held against rotation by engagement of the walls against the opposite parallel sides of the hexagonal head 12. The walls are sufficiently flexible however to flex outwardly when sufficient torque is applied to the head 12 of bolt 10 to allow the bolt to rotate and snap into any one of six angular positions relative to the retainer.

When the bolt and retainer are assembled together as a unit the shank 11 of the bolt is passed through the circular aperture 33 in the reflector bowl flange 32, until the lugs 15, 16 pass through the aperture and snap outwardly behind the flange to secure the bolt and retainer on the flange. As can be seen best from FIG. 8, a side of the base 21 of the retainer 20 lies adjacent the wall portion 34 so that the retainer is non-rotatable relative to the flange 32. The headlamp reflector bowl assembly is then brought up to the support panel 31 and the shank 11 of the bolt 10 is threaded into the nut 36 to secure the bowl assembly to the support panel.

It will be appreciated that rotation of the bolt 10 will adjust the position of the bowl 30 relative to the support panel 31. This positional adjustment can be achieved by applying torque with a screwdriver or spanner to the head of the bolt or by gripping and turning the tip 13 of the bolt shank. Rotation of the bolt 10 is achieved only by applying sufficient torque to overcome the restraint of the walls 23 and 24 of the retainer 20 which thus provide step-wise rotation and indexing of the bolt.

It will be understood that a bolt 10 and retainer 20 will be provided in at least two positions around the reflector bowl 30 so that a tilting adjustment of the bowl relative to the support can be readily achieved.

The bolt 10 and retainer 20 are not limited to use in a reflector bowl assembly and can be used in any assembly where it is necessary to provide stepwise rotation of a bolt relative to a member through which the bolt passes only when a predetermined torque is applied to the bolt.

The external shape of the head of the bolt can be modified to provide any even number of flat faces, it can be oval in shape or any other convenient noncircular shape.

Further minor modifications can be made to the above described embodiment without departing from the spirit and scope of the invention which is best described in the following claims.

What I claim is:

1. An installation comprising, in combination, an apertured, relatively rigid support member and a two-part fastener assembly mounted on said member, said fastener assembly including a bolt having a head disposed at one side of said support member and a threaded shank joined to the head and projecting through the aperture in the support member and beyond the opposite side of said member, said shank carrying integral, resilient, support member engaging, projecting means, said projecting means being joined to the said shank in the vicinity of said head, but being spaced from the head and engaging said opposite side of said support member, and a bolt locking retainer captive on said bolt shank between said head and said projecting means, but normally subject to limited axial play relative to said shank between said head and said projecting means, said retainer having an apertured base through which said shank extends and said base, in said installation, being tensioned against said one side of said support member by the cooperative action of said bolt and head bearing on said base and said projecting means resiliently engaging said opposite side of said support member and drawing said head toward said one side of said member, and cooperating locking means on said bolt head and said retainer restraining said bolt against unintentional rotation relative to said support member, but permitting intentional incremental rotation of said bolt relative to said support member, said locking means including at least two, resilient upstanding side walls joined to the base of said retainer, said walls being spaced apart and being disposed in substantially parallel planes and being provided with a slot adjacent said base to provide improved resiliency and deflectability in said walls, said bolt head being snugly fitted between said walls and said walls being outwardly deflectable away from each other responsive to deliberate rotation of said bolt head, whereby, under normal usage conditions, the position of said support member relative to another member carrying a nut engaging said bolt shank may be adjusted responsive to deliberate incremental rotation of said bolt head with respect to said retainer, but said bolt shank is effectively restrained from unintentional rotation responsive to vibratory forces acting on said installation.

2. An installation according to claim 1 wherein said bolt head is formed with at least one side face and said face is in engagement with at least one of said walls of said retainer.

3. An installation according to claim 2 wherein said bolt head has a polygonal configuration as viewed in elevation and has an even number of side faces.

4. An installation according to claim 1 wherein said projecting means on said bolt shank comprises a plurality of flexible tongues disposed at an acute angle relative to the longitudinal axis of said shank and having free ends engaging said opposite side of said support member, said tongues being deflectable both radially and longitudinally relative to said bolt shank.

5. An installation according to claim 1 wherein said bolt shank has an end portion remote from said head which is of a noncircular configuration and is adapted to be engaged by a tool for transmitting torque to said bolt.

* * * * *